United States Patent [19]

Sugimori et al.

[11] Patent Number: 4,981,987
[45] Date of Patent: Jan. 1, 1991

[54] ADHESION-IMPROVER

[75] Inventors: Masaru Sugimori, Takatsuki; Tadao Kunishige, Kusatsu; Koichiro Sanji, Takatsuki, all of Japan

[73] Assignee: Sunstar Giken Kabushiki Kaisha, Osaka, Japan

[21] Appl. No.: 836,301

[22] Filed: Mar. 5, 1986

[30] Foreign Application Priority Data

Mar. 5, 1985 [JP] Japan ................................. 60-44422

[51] Int. Cl.$^5$ ............................................. C07F 7/10
[52] U.S. Cl. ................................. 556/419; 560/155; 560/174; 560/180; 560/190; 564/193; 564/197; 564/199; 556/410
[58] Field of Search ................ 556/419, 410; 560/155, 560/174, 180, 190; 564/193, 197, 199

[56] References Cited

U.S. PATENT DOCUMENTS

| | | | |
|---|---|---|---|
| 3,962,160 | 6/1976 | Beers et al. | 556/418 X |
| 4,352,917 | 10/1982 | Tripp | 556/418 X |
| 4,727,168 | 2/1988 | Yoshino et al. | 556/419 U X |

*Primary Examiner*—Paul F. Shaver

*Attorney, Agent, or Firm*—Wegner, Cantor, Mueller & Player

[57] ABSTRACT

An adhesion-improver which comprises a reaction product of an amino compound having a primary and/or secondary amino group in the molecule or a modified amino compound obtained by modifying the amino compound with a compound having an epoxy group, and a carbonyl compound, particularly a dicarbonyl compound of the formula:

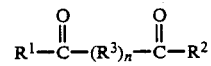

wherein $R^1$ and $R^2$ are the same or different and are each an alkyl having 1 to 16 carbon atoms, an aryl having 6 to 12 carbon atoms or an alkoxy having 1 to 4 carbon atoms, $R^3$ is a hydrocarbon group having one or more carbon atoms, and n is 0 or 1, which is useful for improving adhesion of curable compositions such as adhesives, sealing agents, paints and pourable compounds, and a curable composition comprising a conventional main component and the adhesion-improver as set forth above which has excellent adhesion and curing characteristics.

4 Claims, No Drawings

ADHESION-IMPROVER

The present invention relates to an adhesion-improver, more particularly to an adhesion-improver which is an additive for improving the adhesion of a curable composition to a substrate.

PRIOR ART

Conventional curable compositions such as adhesives, sealing agents, paints, pourable compounds, etc. are usually composed of various resins or synthetic rubbers as a main component. In addition to the main component, i.e. resins and rubbers, the curable compositions are usually incorporated with filling agents, plasticizers, solvents, dyes and pigments, flow control agents, and further adhesion-improvers in order to improve the adhesion or bonding properties of the composition to a substrate.

For the purpose of the improvement of adhesion of curable compositions to the substrate, it has been practiced to incorporate a small amount of phenol resins, petroleum resins, epoxy resins, silane coupling agents, titanate coupling agents, and the like. It has also been practiced to previously apply a primer to the substrate in order to improve the adhesion of the curable composition to the substrate.

However, the conventional adhesion-improvers could not improve sufficiently the adhesion after curing of the curable composition, and hence, it has been desired to find a new adhesion-improver. Besides, it is desired to eliminate such an additional step for applying a primer before the application of a curable composition in view of labor-saving.

OBJECT OF THE INVENTION

Under the above situation, the present inventors have intensively studied an improved adhesion-improver which is useful for improving adhesion of curable compositions. The inventors had firstly found that a reaction product of a hydrolyzable alkoxysilane compound having a primary and/or secondary amino group and a carbonyl compound is effective as an adhesion-improver, but as a result of further intensive study, they have now found that a dehydration condensation reaction product of a specific amino compound and a stoichiometrically equivalent or excess amount of a specific carbonyl compound is particularly excellent as an adhesion-improver for curable compositions.

An object of the invention is to provide a novel adhesion-improver suitable for curable compositions. Another object of the invention is to provide an improved curable composition having improved adhesion and curing characteristics. These and other objects and advantages of the invention will be apparent to persons skilled in the art from the following description.

DETAILED DESCRIPTION

The adhesion-improver of the invention comprises a reaction product of an amino compound having a primary and/or secondary amino group in the molecule and a carbonyl compound of the formula:

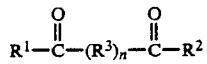

wherein $R^1$ and $R^2$ are the same or different and are each an alkyl group having 1 to 16 carbon atoms (e.g. methyl, ethyl, propyl, butyl, heptyl, hexyl, octyl, nonyl, decyl, undecyl, hexadecyl, etc.), an aryl group having 6 to 12 carbon atoms (e.g. phenyl, tolyl, xylyl, naphthyl, etc.) or an alkoxy group having 1 to 4 carbon atoms (e.g. methoxy, ethoxy, propoxy, butoxy, etc.), $R^3$ is a hydrocarbon group having one or more carbon atoms, such as a straight or branched chain alkylene having 1 to 5 carbon atoms (e.g. methylene, ethylene, propylene, isopropylene, etc.), an alkenylene having 2 to 5 carbon atoms (e.g. vinylene, propenylene, etc.), an arylene having 6 carbon atoms (e.g. 1,4-phenylene), and n is 0 or 1.

The amino compound to be reacted with the carbonyl compound may be a modified amino compound, for instance, a reaction product or a mixture of an amino compound having a primary and/or secondary amino group and an epoxyalkylalkoxysilane compound, or a reaction product or a mixture of an aminoalkylalkoxysilane compound and a compound having an epoxy group.

The amino compound having a primary and/or secondary amino group used in the present invention includes, for instance, aliphatic amines, such as mono- and/or dialkylamines having 1 to 10 carbon atoms in each alkyl moiety (e.g. isopropylamine, diisopropylamine, diethylamine, propylamine, monoallylamine, diallylamine, isobutylamine, sec-butylamine, 2-ethylhexylamine, etc.), mono- or dialkylaminoalkylamines having 1 to 10 carbon atoms in each alkyl moiety (e.g. dimethylaminopropylamine, diethylaminopropylamine, monomethylaminopropylamine, etc.), alkoxyalkylamines having 1 to 10 carbon atoms in the alkoxy moiety and 1 to 10 carbon atoms in the alkyl moiety (e.g. 3-(2-ethylhexyloxy)propylamine, 3-ethoxypropylamine, 3-methoxypropylamine, etc.), alkanolamines having 1 to 10 carbon atoms (e.g. isopropanolamine, ethanolamine, etc.), iminonitriles (e.g. iminodipropionitrile, etc.), acetamides (e.g. thioacetamide, etc.), iminoamines (e.g. methyliminobispropylamine, etc.), aliphatic diamines (e.g. diaminopropane, hexamethylenediamine, ethylenediamine, propylenediamine, butylenediamine, triglycoldiamine, N,N'-diisobutyl-trimethylhexamethylenediamine, etc.), aliphatic triamines (e.g. diethylenetriamine, etc.), aminoalkyl ethers (e.g. di-$\beta$-aminoethyl ether, di-$\gamma$-amino-n-propyl ether, etc.), aminoalkylsulfidqs (e.g. di-$\beta$-aminoethylsulfide, di-$\beta$-aminoethyldisulfide, etc.); alicyclic amines having 6 to 20 carbon atoms, such as mono- or dicycloalkylamines having 6 to 10 carbon atoms in each cycloalkyl moiety (e.g. dicyclohexylamine, cyclohexylamine, etc.), cycloalkyldiamines having 6 to 10 carbon atoms in each cycloalkyl moiety (e.g. 1,8-p-menthanediamine, isophoronediamine, diaminocyclohexane, 4,4'-methylenebis(cyclohexylamine), 1,3-bisaminomethylcyclohexane, 3-aminomethyl-3,3,5-trimethylcyclohexylamine, N,N'-diisobutylisophorone-diamine, etc.); aromatic amines, such as mono- or diphenylalkylamines having 1 to 3 carbon atoms in the alkyl moiety (e.g. dibenzylamine, etc.), aminobenzoic acids (e.g. p-aminobenzoic acid, etc.), aryldiamines (e.g. phenylenediamine, xylylenediamine, dianisidine, 4,4'-diaminodiphenylmethane, 4,4'-diaminodiphenylpropane, etc.), aminoaryl ethers (e.g. 4,4'-diaminodiphenyl ether, etc.), arylenediamines (e.g. phenylenediamine, etc.), aryltriamines (e.g. triaminoxylene, etc.): piperazine compounds (e.g. N-aminoethylpiperazine, 3-(3-aminopropyl)-3,2-dimethylpiperazine, 1-(2-hydroxyethyl)-piperazine, etc.): and further:

polyamidoamines; polyoxyalkylene ether amines: amine-modified butadiene homoor copolymers: polyethyleneimines, and the like. An aminoalkylalkoxysilane compounds as mentioned hereinafter are also used as the amino compound. Preferred amino compounds are compounds having a large molecular weight and polymers. Particularly suitable examples of the amino compounds are aminoalkylalkoxysilanes, cycloalkyldiamines, polyamidoamines, polyoxyalkylene ether amines and amino-modified butadiene homo- or copolymers. These amino compounds may be used alone or in combination of two or more thereof. The amino compounds may also be modified with a specific compound as mentioned below.

The modified amino compound includes a reaction product of the amino compound as mentioned above and an epoxyalkylalkoxysilane compound or a mixture of the reaction product and the amino compound. The epoxyalkylalkoxysilane compound includes, for instance, γ-glycidoxypropyldimethylethoxysilane, γ-glycidoxypropylmethyldiethoxysilane, γ-glycidoxypropyltrimethoxysilane, β-(3,4-epoxycyclohexyl)-ethyltrimethoxysilane, β-(3,4-epoxycyclohexyl)ethylmethyldimethoxysilane, and the like. The reaction of the amino compound and the epoxyalkylalkoxysilane compound is carried out by heating with agitation. The reaction product should have one or more primary and/or secondary amino groups in the molecule.

When the amino compound used in the present invention is an aminoalkylalkoxysilane compound, the modified amino compound is a reaction product of the aminoalkylalkoxysilane compound and a compound having an epoxy group (e.g. an epoxy resin) or a mixture of the reaction product and the amino compound.

The aminoalkylalkoxysilane compound includes, for instance, N-(β-aminoethyl)aminomethyltrimethoxysilane, γ-aminopropyltriethoxysilane, γ-aminopropylmethyldiethoxysilane, N-(β-aminoethyl)-γ-aminopropyltriethoxysilane, N-(β-aminoethyl)-γ-aminopropylmethyldimethoxysilane, and the like. The modified amino compound should retain at least a part of the primary and/or secondary amino group in the molecule. The epoxy resin used as the compound having epoxy group is a glycidyl ether type epoxy resin, for instance, a reaction product of a polyvalent phenol and epichlorohydrin [e.g. diglycidyl ether of 2,2-bis(4-hydroxyphenyl-propane (referred to as "bisphenol A")], a reaction of an alkylene oxide adduct of a polyvalent phenol and epichlorohydrin [e.g. diglycidyl ether of bisphenol A ethylene oxide adduct and optionally bisphenol A propylene oxide adduct], a reaction product of an aliphatic polyvalent alcohol and epichlorohydrin [e.g. triglycidyl ether of glycerin, or diglycidyl ether of 1,6-hexanediol], a hydrated product of a reaction product of a polyvalent phenol and epichlorohydrin [e.g. a polyglycidyl ether of hydrated bisphenol A], alicyclic epoxy resins, novolac epoxy resins, glycidyl ester type epoxy resins, and the like. Particularly suitable example is diglycidyl ether of a polyvalent phenol (e.g. bisphenol A). The epoxy resins have preferably an epoxy equivalent of not more than 500 and are preferably liquid at room temperature.

The carbonyl compound of the above-mentioned formula:

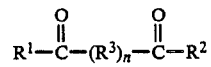

wherein $R^1$, $R^2$, $R^3$ and n are as defined above includes, for instance, ethyl pyruvate, dimethyl maleate, acetylacetone, propionylacetone, an alkyl ($C_1$-$C_5$) methyl diketone (e.g. dimethyl diketone, ethyl methyl diketone), an alkyl ($C_1$-$C_4$) acetacetate (e.g. methyl acetacetate, ethyl acetacetate), dialkyl ($C_1$-$C_4$) malonate (e.g. dimethyl malonate, diethyl malonate, methyl ethyl malonate), dibenzoylmethane, and the like. Among these, dicarbonyl compounds having active methylene group are preferable.

When modified amino compounds as mentioned above are used as the amino compound to be reacted with a carbonyl compound, other carbonyl compounds than the above dicarbonyl compounds as mentioned above can also be used. The other carbonyl compounds include, for instance, aldehydes (e.g. acetaldehyde, propionaldehyde, n-butyraldehyde, isobutyraldehyde, diethylacetaldehyde, glyoxal, benzaldehyde, etc.), cyclic ketones (e.g. cyclopentanone, trimethylcyclopentanone, cyclohexanone, trimethylcyclohexanone, etc.), aliphatic ketones (e.g. acetone, methyl ethyl ketone, methyl propyl ketone, methyl isopropyl ketone, methyl isobutyl ketone, diethyl ketone, dipropyl ketone, diisopropyl ketone, dibutyl ketone, diisobutyl ketone, etc.), and the like.

The reaction of the amino compound and the carbonyl compound is carried out under the same conditions as in the conventional dehydration condensation reaction of an amine and an aldehyde or ketone. For instance, both compounds are reacted by reacting with reflux in the presence of a moisture absorbent while removing produced moisture. More specifically, an amino compound is reacted with a stoichiometrically equivalent or excess amount of a carbonyl compound (in case of dicarbonyl compound, one of the two keto groups being reacted) in an appropriate organic solvent (e.g. toluene, xylene, benzene) in the presence of a moisture absorbent (e.g. molecular sieves, anhydrous magnesium sulfate) at a temperature of room temperature or elevated temperature (e.g. 30° C. to 80° C.) with agitation.

The reaction products wherein the amino group in the amino compound is blocked with the carbonyl compound is used alone or in combination of two or more kinds thereof for the incorporation into a curable composition.

The curable composition of the present invention comprises as a main component a polyurethane resin, an epoxy resin, a silicone, a modified silicone, a polyvinyl chloride resin, an acrylic resin, a phenol resin, a polyester resin, a polysulfide resin or a curable liquid rubber. The adhesion-improver of the present invention, i.e. the reaction product of an amino compound and a carbonyl compound as mentioned above, is usually incorporated into the curable composition in an amount of 0.05 to 10 parts by weight, preferably 0.1 to 5.0 parts by weight, to 100 parts by weight of whole weight of the curable composition. By the incorporation of the adhesion-improver of the present invention, the curable composition shows improved adhesion to the substrate (e.g. metals, painted metals, plastics, glass, inorganic substances, wooden substrates, etc.). The adhesion-improver of the present invention can also improve the curing characteristics (e.g. curing rate, set-up characteristics) of the curable composition. Besides, by the incorporation of the adhesion-improver of the present invention, the curable composition can directly be applied to the substrate without previous application of any primer which is required for the conventional curable compositions. When the adhesion-improver of the present invention is used in an amount of less than 0.05 part by weight to 100 parts by weight of the curable composition, the desired improvement of adhesion of the curable composition is insufficient, and on the other hand, when the amount is over 10 parts by weight, the curing characteristics of the composition is undesirably inhibited.

The curable composition may also be incorporated with other conventional additives, such as filling agents, plasticizers, solvents, catalysts, antioxidants, pigments, and the like.

The present invention is illustrated by the following Examples but should not be construed to be limited thereto.

EXAMPLE 1

3-(2-Ethylhexyloxy)propylamine (18.7 parts by weight), anhydrous toluene (86.1 parts by weight) and molecular sieves (as a moisture absorbent, 10 parts by weight) are charged into a reactor wherein air is replaced with dry nitrogen gas. To the mixture is gradually added acetylacetone (10.0 parts by weight) at room temperature with agitation. After the addition, the mixture is reacted with agitation at room temperature for 4 hours. After completion of the reaction, the moisture absorbent is filtered off by suction to give an adhesion-improver.

The adhesion-improver obtained above (1.0 part by weight) is added to a curable composition [one-pack type moisture curing polyurethane adhesive (Penguin Cement 930 ®, manufactured by Sunstar Giken K.K., Japan), 100 parts by weight] to give the desired curable composition.

The curable composition thus prepared was subjected to the following test.

The curable composition was applied for the adhesion of a plywood and an aluminum plate, which was cured at 5° C. for 24 hours. The test sample thus prepared was subjected to a peel test under the conditions of atmosphere of 20° C. and 65 % relative humidity, at an angle of 180° at a crosshead speed of 200 mm with Autograph IM-500. As a result, it showed a peel strength of 4.5 kg/25 mm, and the state of break of the test sample was material break, which means that the test sample showed excellent adhesion. As a reference, the same starting curable composition as used above without incorporation of the adhesion-improver was tested likewise. As a result, it showed a peel strength of 1.8 kg/25 mm, and the sample was broken at interface, which means that the adhesion was very weak.

EXAMPLE 2

In the same manner as described in Example 1, 1,8-p-menthanediamine (17.0 parts by weight) and dimethyl malonate (26.4 parts by weight) are subjected to dehydration condensation reaction to give an adhesion-improver.

The adhesion-improver obtained above (1.0 part by weight) is added to the adhesive component (100 parts by weight) of two-pack type polysulfide sealing agent (Betaseel #169-4 ®, manufactured by Sunstar Giken K.K., Japan) to give the desired curable composition.

The curable composition obtained above was subjected to the following test.

The curable composition (100 parts by weight) was mixed with a curing component (10 parts by weight) of the above two-pack type polysulfide sealing agent, and the mixture was applied for the adhesion of stainless steel plates by bead sealing, and it was cured at 20° C. for 7 days. Thereafter, it was subjected to a peel test by hand. As a result, the state of break was material break, which means that the test sample showed excellent adhesion. Thus, the curable composition can be applied without previous application of a primer. As a reference, the same sealing agent as used above was tested likewise without using any adhesion-improver of the present invention. As a result, it was broken at interface.

EXAMPLE 3

An epoxy resin Epicote 828 ®, manufactured by Yuka Shell Epoxy Co., Japan, 22.8 parts by weight) and β-aminopropyltriethoxysilane 22.1 parts by weight) are reacted at 50° C. for 24 hours. The reaction product or a mixture of the above reactants (totally 44.9 parts by weight) is reacted with cyclohexanone (9.8 parts by weight) in the same manner as described in Example 1 to give an adhesion-improver.

The adhesion-improver obtained above (2.5 parts by weight) is added to a moisture curing polyurethane sealing agent (Penguin Seal #955 ®, manufactured by Sunstar Giken K.K., Japan, 100 parts by weight) to prepare the desired curable composition.

The curable composition thus prepared was subjected to the following test.

The curable composition was applied for the adhesion of aluminum plates by bead sealing, which was cured at 20° C. for 7 days. The test sample thus prepared was subjected to a peel test by hand at room temperature. As a result, the state of break of the test sample was material break, which means that the adhesion was very strong, and there was obtained the same adhesion effect as the case a primer was previously applied to the substrate to be adhered. As a reference, the same sealing agent as used above without incorporation of the adhesion-improver was tested likewise. As a result, the sample was broken at interface.

EXAMPLE 4

An epoxy resin (Epicote #822 ®, 22.8 parts by weight) and γ-(2-aminoethyl)aminopropyltrimethoxysilane are reacted at 50° C. for 24 hours. The reaction product or a mixture of the above components (totally 45.0 parts by weight) is reacted with acetylacetone (20.0 parts by weight) in the same manner as described in Example 1 to give an adhesion-improver.

The adhesion-improver obtained above (1.0 part by weight) is added to a moisture curing silicone sealing agent (Penguin Seal 2505 ®, manufactured by Sunstar Giken K.K., Japan, 100 parts by weight) to prepare the desired curable composition.

The curable composition obtained above was subjected to the following test.

The curable composition was applied for the adhesion of polyvinyl chloride plates by bead sealing, which was cured at 20° C. for 7 days. Thereafter, it was subjected to a peel test by hand. As a result, the state of break was material break, which means that the test sample showed excellent adhesion.

EXAMPLE 5

A polyamide resin (Tomide 225-X ®, manufactured by Fuji Kasei K.K., Japan, 35.0 parts by weight) and γ-glycidoxypropyltrimethoxysilane (47.2 parts by weight) are reacted at 50° C. for one day to give a modified amino compound. The modified amino compound thus obtained (82.2 parts by weight) is reacted with ethyl acetacetate (26.0 parts by weight) in the same manner as described in Example 1 to give an adhesion-improver.

The adhesion-improver obtained above (1.5 part by weight) is added to a moisture curing polyurethane adhesive (Penguin Cement 930 ®, manufactured by Sunstar Giken K.K., Japan, 100 parts by weight) to prepare a curable composition.

The curable composition was subjected to a peel test in the same manner as described in Example 1. As a result, it showed a peel strength of 49 kg/25 mm, and the state of break was material break. The curable composition was excellent both in the curing characteristics and adhesion.

EXAMPLE 6

A polyoxypropylenediamine (Jeffermin D400 ®, manufactured by Texaco Chem. Co., 20.0 parts by weight) is reacted with γ-glycidoxypropyltrimethoxysilane (47.2 parts by weight) at 50° C. for one day to give a modified amino compound. The modified amino compound thus obtained (67.2 parts by weight) is reacted with methyl isobutyl ketone (20.0 parts by weight) in the same manner as described in Example 1 to give an adhesion-improver.

The adhesion-improver thus obtained (3 parts by weight) is added to a reduction component (100 parts by weight) of a Redox type acrylic adhesive (Tuff Lock 6201 ®, manufactured by Sunstar Giken K.K., Japan) to give a curable composition.

The curable composition obtained above was subjected to the following test.

The curable composition (the reduction component, 100 parts by weight) was mixed with an oxidizing component (10 parts by weight) of the above Redox type acrylic adhesive, and the mixture was applied for the adhesion of a steel plate and a plastic plate and both plates were adhered overlapping in a length of 25 mm. The test piece thus prepared was kept at room temperature for one day in order to cure the adhesive, and then it was subjected to a test of an adhesive strength under shear. As a result, it showed a strength of 250 kg/cm². As a reference, the same adhesive as used above was tested likewise without using any adhesion-improver of the present invention. As a result, it showed a adhesive strength under shear of 220 kg/cm².

We claim:

1. An adhesion-improver, which comprises a reaction product of an amino compound having a primary and/or a secondary amino group in the molecule and a carbonyl compound of the formula:

$$R^1-\overset{O}{\underset{\|}{C}}-CH_2-\overset{O}{\underset{\|}{C}}-R^2$$

wherein $R^1$ and $R^2$ are the same or different and are each an alkyl having 1 to 16 carbon atoms or an alkoxy having 1 to 4 carbon atoms, said amino compound being a member selected from the group consisting of an alkoxyalkylamine having 1 to 10 carbon atoms in the alkoxy moiety and 1 to 10 carbon atoms in the alkyl moiety; a cycloalkyldiamine having 6 to 10 carbon atoms in the cycloalkyl moiety; a reaction product or a mixture of an amino compound selected from polyamidoamines and polyoxyalkylene ether amines and an epoxyalkylalkoxysilane compound selected from γ-glycidoxypropyldimethylethoxysilane, γ-glycidoxypropylmethyldiethoxysilane, γ-glycidoxypropyltrimethoxysilane, β-(3,4-epoxycyclohexyl)-ethyltrimethoxysilane, and β-(3,4-epoxycyclohexyl)ethylmethyldimethoxysilane; and a reaction product or a mixture of an aminoalkylalkoxysilane compound selected from N-(β-aminoethyl)aminomethyltrimethoxysilane, γ-aminopropyltrimethoxysilane, γ-aminopropylmethyldiethoxysilane, N-(β-aminoethyl)-γ-aminopropyltrimethoxysilane, N-(β-aminoethyl)-γ-aminopropyltriethoxysilane, and N-(β-aminoethyl)-γ-aminopropylmethyldimethoxysilane and a compound having an epoxy group selected from digylcidyl ether of bisphenol A, diglycidyl ether of bisphenol A ethylene oxide adduct, triglycidyl ether of glycerine, diglycidyl ether of 1,6-hexanediol, and a polyglycidyl ether of hydrated bisphenol A.

2. The adhesion-improver according to claim 1, wherein the amino compound having a primary and/or secondary amino group in the molecule is the reaction product or the mixture of an amino compound and an epoxyalkylalkoxysilane compound.

3. The adhesion-improver according to claim 1, wherein the amino compound having a primary and/or secondary amino group in the molecule is the reaction product or the mixture of an aminoalkylalkoxysilane and the compound having an epoxy group.

4. An adhesion-improver, which comprises a reaction product of a carbonyl compound selected from the group consisting of a compound of the formula:

$$R^1-\overset{O}{\underset{\|}{C}}-CH_2-\overset{O}{\underset{\|}{C}}-R^2$$

wherein $R^1$ and $R^2$ are as defined in claim 1; a cyclic ketone selected from cyclopentanone, trimethylcyclopentanone, cyclohexanone, and trimethylcyclohexanone; and an aliphatic ketone selected from acetone, methyl ethyl ketone, methyl propyl ketone, methyl isopropyl ketone, methyl isobutyl ketone, diethyl ketone, dipropyl ketone, diisopropyl ketone, dibutyl ketone, and diisobutyl ketone with an amino compound selected from the reaction product or the mixture of an amino compound selected from polyamidoamines and polyoxyalkylene ether amines and an epoxyalkylalkoxysilane compound as set forth in claim 1 and the reaction product or the mixture of an aminoalkylalkoxysilane compound and a compound having an epoxy group as set forth in claim 1.

* * * * *